(12) United States Patent  (10) Patent No.: US 8,054,383 B2
Lee  (45) Date of Patent: Nov. 8, 2011

(54) DISPLAY APPARATUS AND METHOD OF PREVENTING IMAGE BURN-IN

(75) Inventor: Sung-tae Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1233 days.

(21) Appl. No.: 11/491,975

(22) Filed: Jul. 25, 2006

(65) Prior Publication Data

US 2007/0046815 A1  Mar. 1, 2007

(30) Foreign Application Priority Data

Aug. 31, 2005  (KR) .................. 10-2005-0080834

(51) Int. Cl.
*H04N 5/445* (2006.01)
*H04N 9/76* (2006.01)

(52) U.S. Cl. ........ 348/569; 348/173; 348/615; 348/553; 345/629

(58) Field of Classification Search .................. 348/173, 348/569, 553, 607, 615; 345/611, 629; 715/716, 715/798

See application file for complete search history.

(56) References Cited

U.S. PATENT DOCUMENTS

| 7,102,694 | B2 * | 9/2006 | Jang | 348/607 |
| 7,403,194 | B2 * | 7/2008 | Gu | 345/204 |
| 7,474,356 | B2 * | 1/2009 | Lee | 348/569 |
| 2005/0104874 | A1 | 5/2005 | Koh | |

FOREIGN PATENT DOCUMENTS

| CN | 1484433 | 3/2004 |
| KR | 2004-26057 | 3/2004 |
| KR | 2004-91297 | 10/2004 |

* cited by examiner

*Primary Examiner* — Jefferey Harold
*Assistant Examiner* — Jean W Desir
(74) *Attorney, Agent, or Firm* — Stanzione & Kim, LLP

(57) ABSTRACT

A method of preventing image burn-in of a display apparatus to display an image includes detecting pixel data of a pixel of the image, calculating OSD data corresponding to the detected pixel data, generating the calculated OSD data, and merging the OSD data to the pixel data and displaying the merged OSD data in the pixel for a predetermined refresh period of time.

31 Claims, 3 Drawing Sheets

DISPLAY APPARATUS AND METHOD OF PREVENTING IMAGE BURN-IN

CROSS-REFERENCE TO RELATED APPLICATIONS

This application claims priority under 35 U.S.C. §119(a) from Korean Patent Application No. 2005-0080834, filed on Aug. 31, 2005, in the Korean Intellectual Property Office, the disclosure of which is incorporated herein by reference in its entirety.

BACKGROUND OF THE INVENTION

1. Field of the Invention

The present general inventive concept relates to a display apparatus and a method of preventing image burn-in thereof, and more specifically, to a display apparatus which performs an eliminating operation of image burn-in using an OSD (on-screen display) function and a method of preventing the image burn-in thereof.

2. Description of the Related Art

Conventionally, a CRT (Cathode Ray Tube) has generally been used as a display apparatus. However, the CRT has some problems in that it is heavy, thick, and consumes too much power. Recently, the CRT has been replaced with an FPD (Flat Panel Display). An LCD (Liquid Crystal Display) panel or a PDP (Plasma Display Panel) is mainly employed as the flat display panel, which displays an image.

When such a PDP or LCD, which is widely employed as a computer monitor or television, is used as a computer monitor, still images are frequently displayed for a long period of time. Likewise, even when the PDP or LCD is used as a television, still images, such as a screen shot for screen adjustment, are also displayed for a long period of time.

However, the PDP and LCD have a problem in that when still images are displayed for a long period of time thereon, image burn-in is induced by the still images. For example, regarding the PDP, if still images are displayed for a long period of time, phosphors in barrier ribs of cells become worn out, and thus image burn-in occurs between a bright side and a dark side of the PDP. In addition, regarding the LCD, a response to a video signal is not very rapid, and thus image burn-in of previous still images remains while the still images are replaced by other images. Image burn-in reduces an image quality of the PDP or LCD, which may give rise to complaints from consumers.

Thus, various conventional methods have been proposed to reduce the image burn-in mentioned above in display apparatuses, such as LCD, PDP, etc.

For example, there is a conventional method for reducing image burn-in by scrolling the image toward an upper, lower, left and/or right side of the display apparatus after a period set by the user elapses, and thus an image displayed in each pixel unit is changed. In addition, a conventional method to reduce image burn-in, for example, by decreasing a gain of a signal using an operation sensor, has been proposed.

However, the conventional methods mentioned above, which reduce image burn-in by periodically scrolling a screen, cannot effectively prevent the image burn-in due to a time delay between a first scroll and a second scroll, and can inconvenience users since the screen is muted for a while during the time period of the scroll.

In addition, the conventional methods, which prevent image burn-in by shifting a screen, can prevent the image burn-in by a signal located on a border line. However, there is a problem that when the still images are maintained on only a partial region, image burn-in cannot effectively be prevented with respect to the partial region. In addition, the conventional method of preventing the image burn-in using a sensor needs a separate sensor circuit, and may decrease brightness due to an operation recognition error of the sensor when a user does not approach the display apparatus.

SUMMARY OF THE INVENTION

The present general inventive concept provides a display apparatus, which can effectively prevent image burn-in by generating and displaying OSD (on-screen display) data according to a data value of an input video signal, and a method of prevent the image burn-in thereof.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of preventing image burn-in of a display apparatus which displays an image, comprising detecting pixel data of a first pixel of the image, calculating OSD data corresponding to the detected pixel data, generating the calculated OSD data, and merging the OSD data with the pixel data and displaying the merged data in the first pixel for a predetermined refresh period of time.

The method may further comprise sequentially shifting the OSD data from the first pixel to each of a plurality of pixels, and sequentially displaying the shifted OSD data in each of the plurality of pixels for the predetermined refresh period of time.

The OSD data may be displayed in a predetermined size.

The OSD data may be sequentially shifted in a predetermined direction by a pixel unit.

The detecting of the pixel data of the image may comprise detecting R, G, and B data values of the first pixel.

The calculating of the OSD data may comprise comparing a value of the detected pixel data to a predetermined reference value, deducting the predetermined value from the detected pixel data value if the detected pixel data value is greater than the reference value, and adding the predetermined value to the detected pixel data value if the detected pixel data value is smaller than the reference value.

The foregoing and/or other aspects and utilities of the present general inventive concept may also be achieved by providing a method of preventing image burn-in of a display apparatus which displays an image, comprising detecting R, G, and B data of a predetermined pixel of the image, comparing values of each of the detected R, G, and B data to a predetermined reference value to calculate OSD data values corresponding to each of the R, G, and B data values, and generating OSD data according to the calculated OSD data values, merging the OSD data with the R, G, and B data and displaying the merged data in the predetermined pixel for a predetermined refresh period of time.

The method may further comprise sequentially shifting the OSD data in a predetermined direction by a pixel unit.

The foregoing and/or other aspects and utilities of the present general inventive concept may be achieved by providing a display apparatus having a display to display an image, comprising an OSD generator to generate OSD data corresponding to pixel data of a video signal, a signal processor to process the video signal, to merge the video signal with the OSD data, and to output the merged data to the display, and a controller to detect the pixel data, to control the OSD generator to generate the OSD data corresponding to the pixel data, and to control the OSD data to be sequentially shifted on the display.

The controller may comprise a pixel detector to detect the pixel data, an OSD calculator to calculate an OSD data value corresponding to a value of the detected pixel data, and a shift executer to control the OSD data, which correspond to the calculated OSD data value, to be sequentially shifted and then displayed.

The shift executer may control the OSD data to be sequentially shifted from a location of a predetermined pixel on the display.

The shift executer may control the OSD data to be sequentially shifted in a predetermined size on the display.

The shift executer may control the OSD data to be sequentially shifted in a predetermined direction by a pixel unit.

The foregoing and/or other aspects and utilities of the present general inventive concept may also be achieved by providing a display apparatus having a display unit to display an image, comprising a processing unit to generate OSD data for each pixel of a plurality of pixels using corresponding image data of respective ones of the plurality of pixels and to merge the OSD data with the corresponding image data, and a control unit to control the processing unit to generate the OSD data and to merge the OSD data with the corresponding image data, and to control the display unit to sequentially display the merged data in the respective ones of the plurality of pixels for a predetermined period of time.

The controller may calculate OSD data values using values of the corresponding image data, and may control the processing unit to generate the OSD data using the OSD data values. The controller may compare the values of the corresponding image data to a predetermined reference value, and may calculate the OSD data values based on the comparison results.

The foregoing and/or other aspects and utilities of the present general inventive concept may also be achieved by providing a display device to display images, comprising a data managing unit to generate OSD data for each pixel of a plurality of groups of pixels using corresponding image data of each pixel and to merge the OSD data for each pixel with the corresponding image data, and a control unit to control the data managing unit to generate the OSD data and to merge the OSD data for each pixel with the corresponding image data, and to control the display device to sequentially display the merged data for each group of pixels of the plurality of groups of pixels for a predetermined period of time.

The foregoing and/or other aspects and utilities of the present general inventive concept may also be achieved by providing a method to prevent image burn-in in an image forming apparatus, comprising generating OSD data for each pixel of a plurality of pixels using corresponding image data of respective ones of the plurality of pixels, merging the OSD data with the corresponding image data, and sequentially displaying the merged data in the respective ones of the plurality of pixels for a predetermined period of time.

The generating of the OSD data may comprise calculating OSD data values using values of the corresponding image data, and generating the OSD data using the OSD data values. The calculating of the OSD data values may comprise comparing the values of the corresponding image data to a predetermined reference value, and calculating the OSD data values based on the comparison results.

The foregoing and/or other aspects and utilities of the present general inventive concept may also be achieved by providing a method to prevent image burn-in in an image forming apparatus, comprising generating OSD data for each pixel of a plurality of groups of pixels using corresponding image data each pixels, merging the OSD data of each pixel with the corresponding image data, and sequentially display the merged data for each group of pixels of the plurality of groups of pixels for a predetermined period of time.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
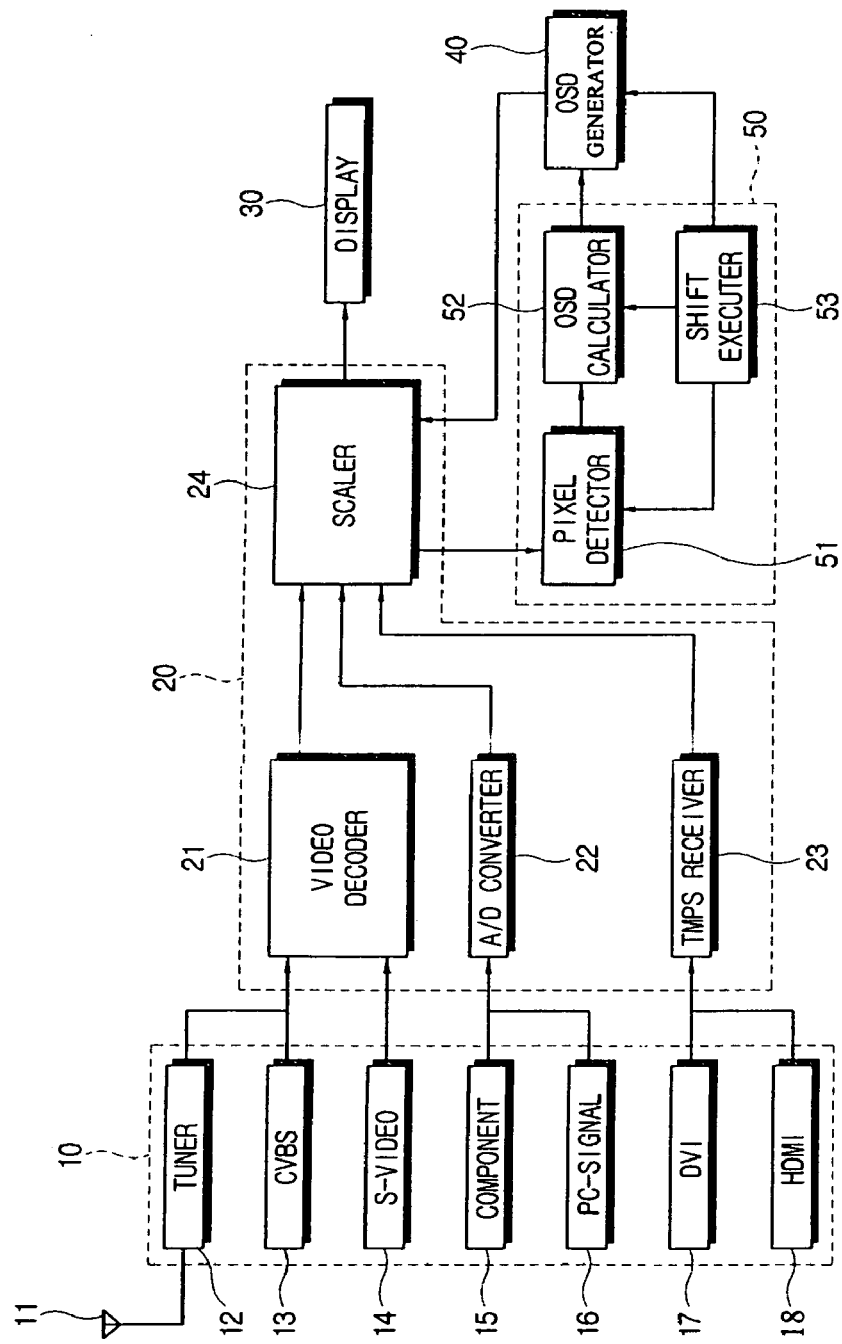
FIG. 1 is a control block diagram illustrating a display apparatus, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a control block diagram illustrating a display apparatus, according to an embodiment of the present general inventive concept. As illustrated in FIG. 1, a display apparatus according to the present embodiment can include a signal receiver 10 to receive a broadcast signal and a predetermined signal from an external source, a signal processor 20 to process the received signal, a display 30 to display the processed signal as an image, an OSD (on-screen display) generator 40, and a controller 50.

The signal receiver 10 includes an antenna 11 to receive the broadcast signal, and a tuner 12 to tune the broadcast signal of a specific channel selected by a user. Also, the signal receiver 10 may include a CVBS (Composite Video Baseband Signal) terminal 13, an S-video terminal 14, a Component terminal 15, a PC-signal terminal 16, a DVI (digital video/visual interactive) terminal 17, and a HDMI (High-Definition Multimedia Interface) terminal 18, in which a video signal corresponding to various external sources is received.

The signal processor 20 transforms the signal input through the signal receiver 10 to a signal format which can be processed by the display 30. As illustrated in FIG. 1, the signal processor 20 according to this embodiment of the present general inventive concept may include a video decoder 21, an A/D (analogue/digital) converter 22, a TMDS receiver 23, and a scaler 24.

The video decoder 21 decodes an analogue video signal, such as a CVBS (composite video broadcast signal) or an S-video signal, input from an analogue connection terminal and outputs the decoded signal to the scaler 24. The A/D converter 22 transforms an input analogue video signal, such as a component signal or a PC signal, to a digital video signal and outputs the transformed signal to the scaler 24. In addition, the TMDS receiver 23 splits a digital video signal, such as a DVI signal input from outside of the display apparatus through the signal receiver 10, into an RGB digital signal and an HN synchronization signal and outputs the split signal to the scaler 24. The scaler 24 transforms the input video signal such that the video signal has a vertical frequency, a resolution, a screen ratio, etc., fitted for an output standard of the display 30.

The display 30 receives the video signal from the signal processor 20 to display an image. The display 30 includes a display panel (see FIG. 3) on which an image is displayed, and a panel driver (not illustrated) to drive the display panel to display the image by processing the video signal input from the signal processor 20. Although an LCD panel or PDP panel can be used as an example of the display panel, the present general inventive concept is not so limited, and thus other display panels that have possibility of burn-in are also applicable.

The OSD generator 40 generates OSD data for each pixel of the video signal according to a control signal of the controller 50, which will be described later. A video signal output from the OSD generator 40 is mixed with the video signal output from the scaler 24, and then displayed on the display panel of the display 30.

The controller 50 detects pixel data of the video signal processed by the scaler 24, and controls the OSD generator 40 to generate the OSD data corresponding to the pixel data. The controller 50 can be implemented as a software program and a processor, such as a microcomputer, a CPU (central processing unit), etc., to load and execute the program. As illustrated in FIG. 1, the controller 50 according to this embodiment of the present general inventive concept may include a pixel detector 51, an OSD calculator 52, and a shift executer 53.

The pixel detector 51 detects values of R (red), G (green), and B (blue) data, corresponding to each pixel of the video signal processed by the scaler 24. The OSD calculator 52 calculates an OSD data value corresponding to each pixel based on the R, G, and B data values detected by the pixel detector 51. The OSD data value calculated for each pixel by the OSD calculator 52, which may be programmed to have a predetermined difference from the R, G, and B data values, may be determined as a more effective value to prevent image burn-in according to the broadcast signal and the display apparatus. For example, when each of R, G, and B video signals has 8 bits, the value of 128 can be added or subtracted to/from each value of R, G and B data value to calculate as the OSD data value for that pixel. The OSD calculator 52 calculates an OSD data value for each of the R, G, and B data values, and calculates different OSD data values corresponding to the R, G, and B data values if the R, G, and B data values are different from one another. Needless to say, other values can be added/subtracted and such value may change during the calculation process (need not stay constant).

The OSD generator 40 transforms the calculated OSD data value to the OSD data and outputs the OSD data to the scaler 24, which in turn merges the R, G, and B data of a pixel with the corresponding OSD data for that pixel and outputs the merged OSD data to the display 30. The merged OSD data can be set to a predetermined size and can be displayed in a predetermined number of pixels, for example in one pixel, as in this embodiment of the present general inventive concept. That is, the merged OSD data is displayed in one pixel of a screen displayed on the display 30. One pixel is a very small pixel unit, and thus image burn-in can be prevented while at the same time a user does not detect a change in the screen even though the merged data is being displayed in the one pixel. The size of the OSD data can be varied so that a plurality of pixels can be constituted as the OSD data. In this case, plurality of OSD data values can be calculated and merged simultaneously to the corresponding number of image data values in the scaler.

The shift executer 53 controls the OSD data such that the OSD data is sequentially shifted from a predetermined location on the screen of the display 30 in a predetermined direction to be displayed thereon. For example, the shift executer 53 detects R, G, and B data from an upper left end pixel of the screen, generates OSD data corresponding to the R, G, and B data, merges the OSD data with the corresponding R, G, and B data, and displays the merged OSD data in the upper left end pixel. When a predetermined refresh period of time lapses, the shift executer 53 allows the OSD data to be shifted to an adjacent pixel, adjacent to the right side of the upper left end pixel (i.e., a next pixel), to generate next OSD data corresponding to R, G, and B data of the next pixel, to merge the OSD data with the corresponding the R, G, and B data of the next pixel, and to display the OSD data on corresponding location, i.e., in the next pixel. Accordingly, regardless of an input video signal, if the display apparatus is applied with power and an image is displayed on a screen thereof, it is possible to prevent image burn-in from occurring on the screen by generating and displaying OSD data of one or more pixel size and then sequentially shifting the OSD data one or more pixel at a time. Although the shifting of the OSD data has been described as shifting in a left-to-right linear direction, the present general inventive concept is not so limited. Thus, the OSD data may be shifted in any direction, such as vertically, horizontally, and/or diagonally, and may be shifted according to a predetermined pattern or randomly.

The pixel detector 51, the OSD calculator 52, and the shift executer 53 may be implemented by an algorithm which can be programmed according to various known methods.

A method of preventing image burn-in of a display apparatus according to the above-mentioned construction will be described with reference to FIGS. 2 and 3.

Figure 2:
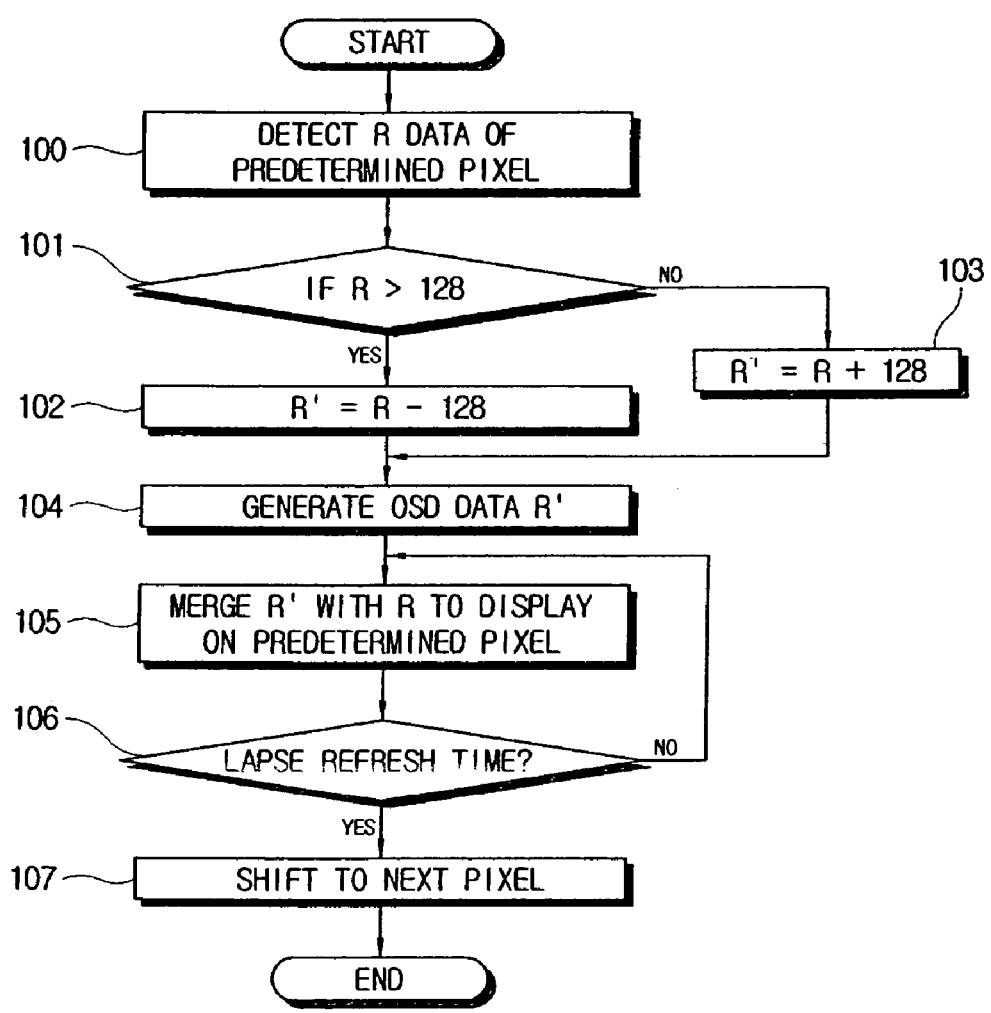
FIG. 2 is a view illustrating a control flow chart of the display apparatus of FIG. 1, according to an embodiment of the present general inventive concept.

FIG. 2 is a view illustrating a control flow chart of the display apparatus of FIG. 1, according to an embodiment of the present general inventive concept. When the display apparatus powers on and the display panel (see FIG. 3) of the display 30 is driven, the pixel detector 51 sequentially detects R, G, and B image data for each pixel of a video signal, which is processed through the signal processor 20, located on a left top side of the display panel (operation 100). The controller 50 determines whether a value of the detected R data is greater than a predetermined value, such as 128 (operation 101). If the detected R data value is greater than the predetermined value, such as 128, then the value of the detected R data value minus the predetermined value, such as 128, is set as an OSD data value (operation 102). If the detected R data value is smaller than the predetermined value, such as 128, then the value of detected R data value plus the predetermined value, such as 128, is set as the OSD data value (operation 103). The predetermined value is not required to be 128, and thus may alternatively be other values.

The OSD generator 40 generates OSD data R' corresponding to the calculated OSD data value for the detected R data value, and outputs the OSD data R' to the scaler 24 (operation 104). The scaler 24 merges the OSD data R' with detected R data to output the merged OSD (i.e., R' and R) data to the display 30, and the display 30 displays the merged OSD (i.e., R' and R) data in a corresponding pixel (operation 105). The other image data for that pixel, i.e., the detected G and B data and the corresponding OSD data G' and B' also are displayed in the corresponding pixel through the same process. Each of R', G', and B' may comprise of values for a plurality of pixels. When a predetermined refresh period of time has not lapsed, the merged OSD data continues to be displayed (106). When the predetermined period of time has lapsed, the OSD data is shifted from the pixel to a next pixel, such as the pixel adjacent to the previous pixel (operation 107).

Figure 3:
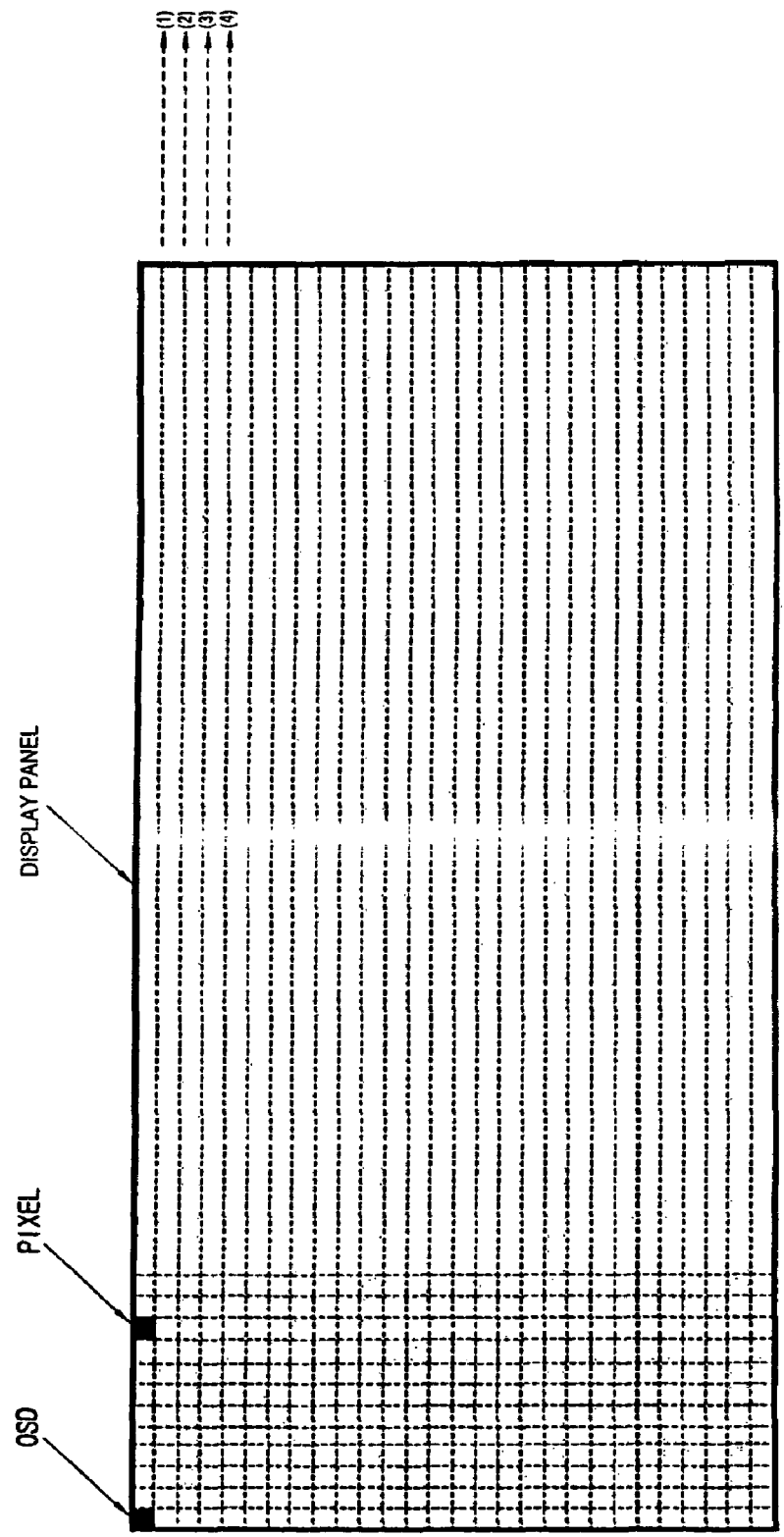
FIG. 3 is a view illustrating a shifting method of a screen of a display apparatus, according to an embodiment of the present general inventive concept.

As illustrated in FIG. 3, OSD data is displayed on a pixel located on a left top side of a display panel for a predetermined refresh period of time. When the refresh time lapses, the OSD data is shifted to a next pixel adjacent to the previous pixel. Specifically, the OSD data is sequentially shifted along the top line of pixels in the direction of (1) in FIG. 3, and when the OSD data has been shifted to a pixel located on a right top side of the display channel, the OSD data is then shifted to a next line (i.e., from the top most line to a second line from the top), and then is shifted along the second line of pixels from the top in the direction of (2). Similarly, the OSD data is shifted and proceeded along the third, fourth, etc., lines of pixels in the directions of (3), (4), etc., to cover all pixels of the display panel, and then the OSD data is returned to the original location to begin the shifting process again. Although the shifting of the OSD data is described as beginning at the top left pixel and proceeding from left to right and top to bottom, the present general inventive concept is not so limited. Accordingly, the shifting can begin at any pixel, and can proceed sequentially according to any predetermined pattern or can proceed randomly in the absence of a predetermined pattern.

Thus, the OSD data having a value corresponding to R, G, and B data values of the original image data is shifted in pixel units (i.e., from one pixel to another) to be sequentially displayed in various pixels, and thus image burn-in can be prevented. The shifting of the pixel as described above may occur a plurality of pixels at a time without departing from the spirit or scope of the present invention.

This process can be constantly performed during a power on state of the display apparatus, and a refresh time period per pixel of OSD data can be set up differently according to a type of display apparatus and programming. In addition, although in embodiments of the present general inventive concept OSD data is sequentially shifted from a left topside of a display, the present general inventive concept is not so limited, and thus the OSD data can instead be shifted in random order by detecting any pixel data and generating corresponding OSD data.

Further, a display apparatus according to embodiments of the present general inventive concept may include a user input unit to select an image burn-in prevention function described above, which may include a wireless remote controller to output an optical signal according to a control of a user and a optical signal receiver, which is provided in the display apparatus, to receive the optical signal from the wireless remote controller. At this time, the controller performs the corresponding image burn-in prevention function only if the image burn-in prevention function is selected at the user input unit.

Although various embodiments of the present general inventive concept encompass shifting OSD data from one pixel to another, the present general inventive concept is not so limited. Thus, the merged data may be initially displayed on a first plurality of pixels for a predetermined period of time, and then shifted to and displayed on a second plurality of pixels for the second period of time. Because a pixel unit is small, the merged data can be displayed on a plurality of pixel units, provided that a number of the plurality of pixel units is sufficiently small such that a user does not detect a change in the screen even though the merged data is being displayed in the plurality of pixels.

As mentioned above, according to the present general inventive concept, a display apparatus, which can effectively prevent image burn-in by generating and displaying OSD data according to a data value of an input video signal, and a method of preventing image burn-in thereof are provided.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of preventing image burn-in of a display apparatus which displays an image based on input image data, comprising:
   detecting pixel data of a first pixel of the input image data;
   calculating OSD data based on the detected pixel data;
   generating the calculated OSD data; and
   merging the OSD data with the pixel data and displaying the merged data in the first pixel for a predetermined refresh period of time.

2. The method according to claim 1, further comprising:
   sequentially shifting the OSD data from the first pixel to each of a plurality of pixels; and
   sequentially displaying the shifted OSD data in each of the plurality of pixels for the predetermined refresh period of time.

3. The method according to claim 1, wherein the OSD data is displayed in a predetermined size.

4. The method according to claim 2, wherein the OSD data is sequentially shifted in a predetermined direction by a pixel unit.

5. The method according to claim 1, wherein the detecting of the pixel data comprises:
   detecting R, G, and B data values of the first pixel.

6. The method according to claim 5, wherein the calculating of the OSD data comprises:
   comparing a value of the detected pixel data to a predetermined reference value;
   deducting the predetermined value from the detected pixel data value if the detected pixel data value is greater than the reference value; and
   adding the predetermined value to the detected pixel data value if the detected pixel data value is smaller than the reference value.

7. A method of preventing image burn-in of a display apparatus which displays an image, comprising:
   detecting R, G, and B data of a predetermined pixel of the image;
   comparing values of each of the detected R, G, and B data to a predetermined reference value to calculate OSD data values based on each of the R, G, and B data values; and
   generating OSD data according to the calculated OSD data values, merging the OSD data with the R, G, and B data, and displaying the merged data in the predetermined pixel for a predetermined refresh period of time.

8. The method according to claim 7, further comprising:
   sequentially shifting the OSD data in a predetermined direction by a pixel unit.

9. A display apparatus having a display to display an image, comprising:
   an OSD generator to detect pixel data of a video signal received by the display and to generate OSD data based on the detected pixel data;
   a signal processor to process the video signal, to merge the video signal with the OSD data, and to output the merged data to the display; and a controller to detect the pixel data, to control the OSD generator to generate the OSD data corresponding to the pixel data, and to control the OSD data to be sequentially shifted on the display.

10. The display apparatus according to claim 9, wherein the controller comprises:
   a pixel detector to detect the pixel data;
   an OSD calculator to calculate an OSD data value corresponding to a value of the detected pixel data; and
   a shift executer to control the OSD data, which corresponds to the calculated OSD data value, to be sequentially shifted and then displayed.

11. The display apparatus according to claim 10, wherein the shift executer controls the OSD data to be sequentially shifted from a location of a predetermined pixel on the display.

12. The display apparatus according to claim 11, wherein the shift executer controls the OSD data to be sequentially shifted in a predetermined size on the display.

13. The display apparatus according to claim 12, wherein the shift executer controls the OSD data to be sequentially shifted in a predetermined direction by a pixel unit.

14. A display apparatus having a display unit to display an image, comprising:
   a processing unit to receive input image data including a plurality of pixels and to generate OSD data for each pixel of a plurality of pixels based on respective ones of the plurality of pixels of the input image data and to merge the OSD data with the corresponding image data; and
   a control unit to control the processing unit to generate the OSD data and to merge the OSD data with the corresponding image data, and to control the display unit to sequentially display the merged data in the respective ones of the plurality of pixels for a predetermined period of time.

15. The display apparatus according to claim 14, wherein the controller calculates OSD data values using values of the corresponding image data, and controls the processing unit to generate the OSD data using the OSD data values.

16. The display apparatus according to claim 15, wherein the controller compares the values of the corresponding image data to a predetermined reference value, and calculates the OSD data values based on the comparison results.

17. A display device to display images, comprising:
   a data managing unit to receive input image data including a plurality of pixels and to generate OSD data for each pixel of a plurality of groups of pixels based on each pixel of the image data and to merge the OSD data for each pixel with the corresponding image data; and
   a control unit to control the data managing unit to generate the OSD data and to merge the OSD data for each pixel with the corresponding image data, and to control the display device to sequentially display the merged data for each group of pixels of the plurality of groups of pixels for a predetermined period of time.

18. A method to prevent image burn-in in an image forming apparatus, comprising:
   generating OSD data for each pixel of a plurality of pixels of received image data, the OSD data generated based on detected pixel data of respective ones of the plurality of pixels of the received image data;
   merging the OSD data with the corresponding image data; and
   sequentially displaying the merged data in the respective ones of the plurality of pixels for a predetermined period of time.

19. The method according to claim 18, wherein the generating of the OSD data comprises:
   calculating OSD data values using values of the corresponding image data; and
   generating the OSD data using the OSD data values.

20. The method according to claim 19, wherein the calculating of the OSD data values comprises:
   comparing the values of the corresponding image data to a predetermined reference value; and
   calculating the OSD data values based on the comparison results.

21. A method to prevent image burn-in in an image forming apparatus, comprising:
   generating OSD data for each pixel of a plurality of groups of pixels based on image data including the each pixel;
   merging the OSD data of each pixel with the corresponding image data; and
   sequentially display the merged data for each group of pixels of the plurality of groups of pixels for a predetermined period of time.

22. A method of preventing image burn-in of a display apparatus which displays an image based on input image data, comprising:
   detecting pixel data of the input image data;
   calculating OSD data based on the detected pixel data by adding or subtracting a predetermined value to/from the detected pixel data; and
   displaying an image having new pixel data which depend upon the OSD data for a predetermined refresh time.

23. The method according to claim 22, wherein the new pixel data is the calculated OSD data.

24. The method according to claim 22 wherein the new pixel data is a merged value of the OSD data and the detected pixel data.

25. The method according to claim 22, wherein the displaying step comprises of sequentially refreshing one or more pixels at a time with the new pixel data.

26. The method according to claim 25, wherein the displaying step comprises of sequentially refreshing the pixels one pixel at a time with the new pixel data.

27. The method according to claim 22, wherein the size of the OSD data is one pixel.

28. The method according to claim 24, wherein said displaying step comprises of sequentially refreshing the pixels of the displayed image one pixel at a time with the new pixel data.

29. The method according to claim 28, wherein the calculation of the OSD data depends upon the value of the detected pixel data.

30. The method according to claim 29, wherein if the value of the detected pixel data is greater than a predetermined value, the OSD data is calculated by subtracting the predetermined value from the detected pixel data.

31. The method according to claim 29, wherein if the value of the detected pixel data is less than a predetermined value, the OSD data is calculated by adding the predetermined value from the detected pixel data.

* * * * *